UNITED STATES PATENT OFFICE.

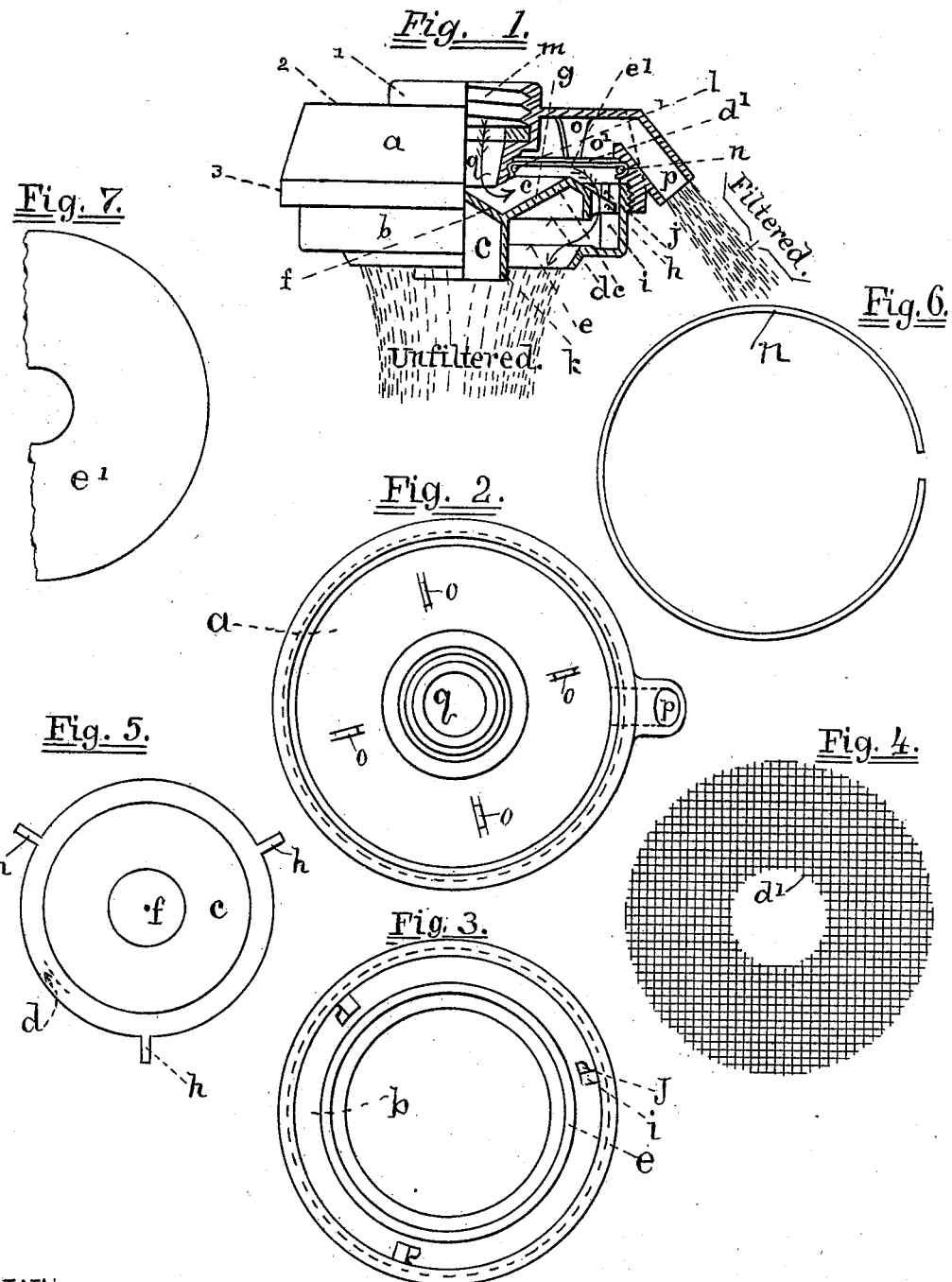

DAVID N. B. COFFIN, OF NEWTON, MASSACHUSETTS.

FAUCET-FILTER.

SPECIFICATION forming part of Letters Patent No. 621,766, dated March 21, 1899.

Application filed March 19, 1898. Serial No. 674,490. (No model.)

*To all whom it may concern:*

Be it known that I, DAVID N. B. COFFIN, of Newton Centre, city of Newton, county of Middlesex, and State of Massachusetts, have invented certain Improvements in Faucet-Filters, of which the following is a full and exact description, reference being had to the accompanying drawings, and to the letters and figures of reference marked thereon, which form a part of this specification.

Figure 1 is a sectional elevation of a filter with dotted spray, indicating the delivery of filtered water and unfiltered water at their respective separate escape-orifices. Fig. 2 is an under view of the upper portion of the filter-body. Fig. 3 is a plan of the lower portion of the filter-body. Fig. 4 is a plan showing the supporting annular disk which supports the filtering annular disk. Fig. 5 is a plan of the deflector-valve. Fig. 6 is a bent wire used to retain and hold in place the outer edge or periphery of the annular filtering-disk. Fig. 7 is a plan of a part of the filtering-disk.

Like letters and figures refer to the same or corresponding parts in all the figures of the drawings.

The nature of my invention relates to improvements in the construction of the class of filters used in direct attachment to the pipe or faucet from which water is drawn for drinking, cooking, and general purposes; and it consists in the construction and adaptation of this class of filters to securing of greater certainty of separation of the filtered and unfiltered water, whereby no mistake can be made in drawing unfiltered or contaminated water when the filtered or pure water is wanted; also, that construction which insures the constant washing and cleansing of the filtering-diaphragm when water is drawn that does not require filtering; also, which makes it necessary for impurities to remain below rather than above the filtering-diaphragm, where they are the more easily washed away so frequently as to insure great purity and constantly so; also, a construction so limiting the flow through the filtering medium as to prevent its being forced to perform beyond its capability for effectual work; also, such as to effectually break the forced flow and prevent spattering when water is drawn to the full capacity of the pipe when not filtering; also, such as to require the simplest possible manipulation to change from filtering to non-filtering action; also, and not least important, such as to make the change from a used filtering diaphragm to a new, fresh, and pure one the simplest and most inexpensive possible, even less than trimming a lamp; such as to provide an independent and separate filtered-water delivery which can never even by accident be mistaken; also, such as to afford great compactness, especially in depth, keeping out of the way of utensils to be set under the filter; such as to afford great simplicity and inexpensiveness in construction and material, so conforming to the closest economy, combined with the greatest efficiency.

Referring to the drawings, Fig. 1, *a* is the upper part or member of the filter-body. *b* is the lower member or section of the body, and *c* is the deflector and valve in one piece. The face of this valve is lettered *d* and its seat *e*. *f* is the first angle of the deflector, and *g* the second. Several fingers or lugs *h* upon the deflector-valve support the valve when lifted off its seat upon the several rests *i*, while *j* affords a stop or stops for the fingers *h*. A finger and thumb projection downward out of the unfiltered discharge-orifice (lettered *c*) affords a convenient means by which to open and close the valve and also helps to govern the unfiltered flow in preventing the spatter when the full capacity of the pipe is being drawn off. *e'* is the filtering material or annular filtering-diaphragm. The opening in its center is smaller than and tightly drawn over the pipe-inlet at *q*, while the periphery is held tightly in its rabbet or place by a spring *n*. A spring *l* may also be used at the inner border, as shown, if desired; but in practice it is found sufficient to draw the diaphragm tightly about inlet-tube *q*.

To form a support for the filtering-diaphragm *e'*, a corresponding annular supporter, of wire-gauze or other finely-perforated material, is supported at its inner and outer edges on suitable bearings, also otherwise by any suitable bearings or bearers O. This support forms a compact sufficient resting-place or support for the filtering-diaphragm as it is pressed upward upon it by the pressure and flow of the water.

As before noted, the periphery or outside edge of the filtering fabric or diaphragm e' is held to a suitable annular rabbet or shoulder in the upper member a of the case by means of the spring or wire n and, being below the wire-gauze support d', located in the upper part of the same rabbet or shoulder, keeps the gauze also in place. The form of this rabbet, if it has an upper shoulder or rest for the gauze, is immaterial, as the spring or wire n, with an outward expanding force, securely holds the outer edge of the diaphragm in place until and all the while that the upward flow and pressure of water acts to compress and compact the filtering diaphragm or fabric upon the gauze support and force that to the upper shoulder of the rabbet and upon its central and intermediate supports q and o, already alluded to. Thus the filtering fabric is compacted so as to give it great density of resistance to the passage of impurities. The impurities are thus very effectually detained upon the under surface, which is so directly exposed to the deflected rush of the unfiltered water whenever that is drawn, and are thereby washed away.

The upper and lower members or sections a and b of the filter-body may be united in any convenient manner, preferably by being screwed together, as shown.

A socket at m is provided with a screw by which the filter is screwed to the ordinary screw-bit of a faucet, with washer shown. When screwed on and the faucet being opened to admit the water, it first passes passage q, strikes angle f of deflector, the valve being open, as shown, then the angle g being thus deflected with great directness across the face of the diaphragm, (see arrows,) thence downward around the valve and out, as indicated by the arrow and the dotted spray lettered "unfiltered." When filtered water is desired, the valve is seized at C and a slight turn drops its fingers h off the rests i and the valve falls to its seat, closing the unfiltered flow. Then the water passing upward through the filtering-diaphragm into the filtered-water chamber o' escapes in a separate filtered stream, as indicated by the filtered water or dotted spray shown and lettered "filtered," Fig. 1.

When the water-supply is sufficient, filtered water for drinking may be drawn without stopping the flow of unfiltered for other purposes. The filtered-water chamber o' is an annular one corresponding to the filtering-diaphragm.

The filtered-water escape p should be small enough to prevent more water from passing through the diaphragm than can be properly filtered.

The diaphragm may be made of any suitable material; but a fine and closely-woven compact cotton cloth is found to give excellent and satisfactory results, and as it is always at hand and no other part is likely to need renewing except at extremely long intervals this material is strongly recommended.

The materials to be used in the construction other than already noted may be of any suitable description, generally such as are commonly used, either cast metal or sheet metal, formed in dies under compression.

The filter may easily and cheaply be made beautiful by the process of electroplating in silver or nickle, and the surfaces 1 2 and 3 may be readily burnished in a lathe.

Having described my invention, what I claim, and desire to secure by Letters Patent, is—

1. A faucet-filter constructed with a central downflow-inlet, and faucet-screw, a lower unfiltered-water chamber having an annular filtering-diaphragm for its top, and a deflector and escape valve in one piece, for its bottom, while the upper filtered-water chamber has a separate independent and contracted filtered-water delivery, substantially as shown and described.

2. The upper single-piece member as constructed viz., having central-screw faucet-socket and washer at the top with a downward extension provided with filtering-diaphragm supporting shoulder or rabbet, the rabbet or shoulder in the outer rim in which to confine the outer periphery of the filtering-diaphragm the supports o the annular filtered-water chamber and exit, and a suitable screw or other connection to a lower member, substantially as shown and described.

3. In a faucet-filter the combination of the deflector-valve, its escape-opening and the annular upward-flow filtering-diaphragm, substantially as shown and described.

4. In a faucet-filter the combination of an upper section containing a central-screwed, downward-flow inlet, an annular upward-flow filtering-diaphragm, an annular filtered-water chamber, and independent contracted filtered-water delivery with a lower section containing a downward-flow unfiltered-water delivery and valve provided with a deflector and means for operating, substantially as shown and described.

5. The lower single-piece member as constructed viz., having a relatively-large valve-seat and unfiltered-water delivery with valve lifts and stops between the valve-seat and peripheral or outer rim and suitable screw or other connection to an upper member substantially as shown and described.

6. The filter as constructed viz. having the bell-shaped upper section containing the central-faucet-screw connection and extension induction-tube, the annular filtered-water chamber and annular diaphragm forming its base, the annular screwed-in valve-seat and its deflector-valve, substantially as shown and described.

7. In a filter the one-piece valve, deflector, and thumb-and-finger projection water-spreader, substantially as shown and described.

8. In a faucet-filter an annular upward-flow filtering-diaphragm, having a central unfiltered-water downward passage in combination with a filtered-water chamber above and a deflector-valve below in connection with the unfiltered-water exit-passage, substantially as shown and described.

9. The combination of the one-piece upper member, the lower one-piece member, the valve-deflector and the filtering-diaphragm fast in the upper member substantially as shown and described.

10. The combination of a washing-deflector and valve in one member, an annular filtering-diaphragm over it, a central downflow-inlet and an unfiltered-water exit-orifice opened and closed by means of said deflector-valve, substantially as shown and described.

11. In a faucet-filter the combination of an upper section having a screw faucet attachment and central inlet therethrough, an annular diaphragm-connecting rabbet or shoulder, said diaphragm, and its holding-ring spring; and a lower section fitted and screwed thereto, and central unfiltered-water exit-opening, and its deflector-valve for opening and closing and washing said diaphragm, substantially as shown and described.

12. The described three-part filter as constructed viz., an upper part or member having central-faucet screw, washer, and central inlet extended for diaphragm-support, the lower part or section having annular valve-seat and exit for unfiltered water in combination with third member i. e. the deflector-valve and its central projection for thumb-and-finger control, substantially as shown and described.

D. N. B. COFFIN.

Witnesses:
FRANK C. HYDE,
ROBERT D. WARE.